Dec. 18, 1956  D. E. GOMMEL  2,774,396
SAW CHAIN, TOOTH THEREFOR AND METHOD OF CUTTING
Filed Feb. 19, 1951
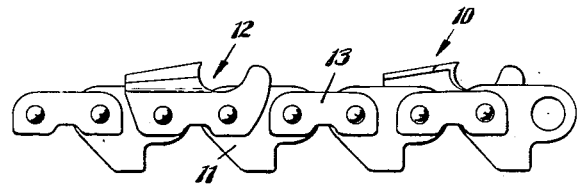
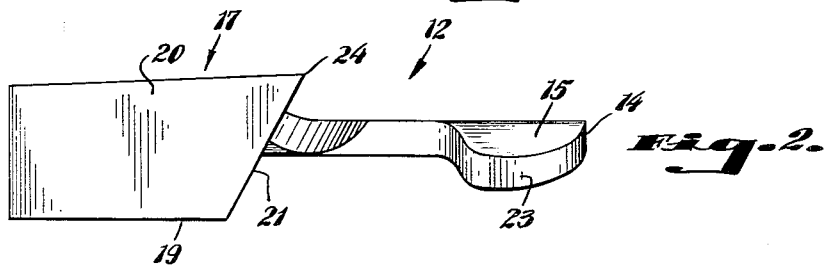
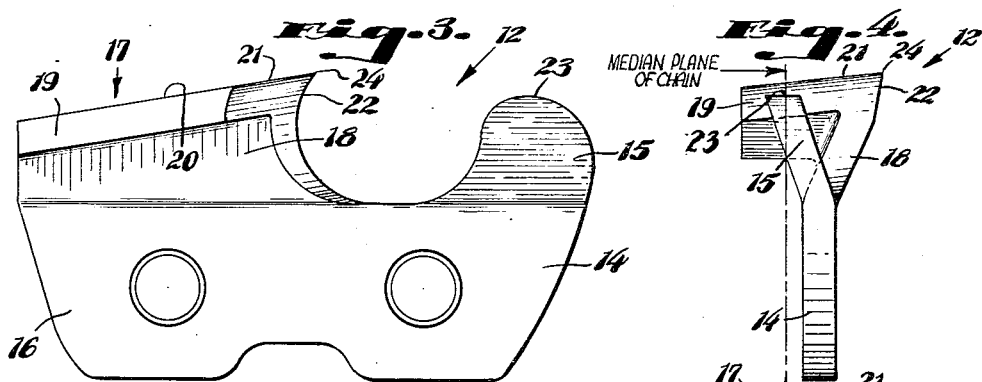
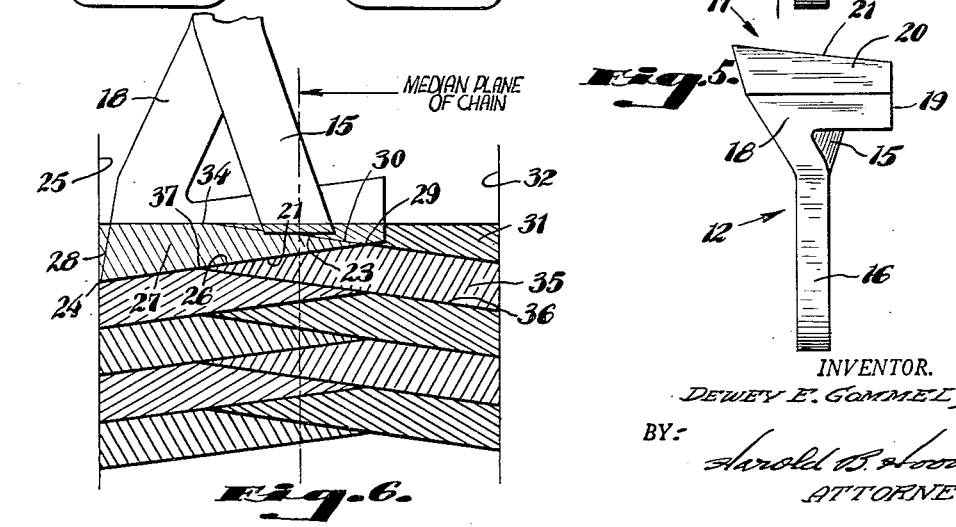
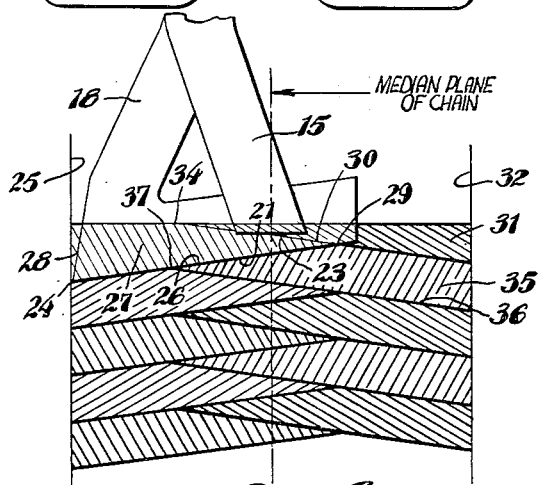
INVENTOR.
DEWEY E. GOMMEL,
BY:
Harold B. Wood.
ATTORNEY.

United States Patent Office 2,774,396
Patented Dec. 18, 1956

2,774,396

SAW CHAIN, TOOTH THEREFOR AND METHOD OF CUTTING

Dewey E. Gommel, Indianapolis, Ind., assignor, by mesne assignments, to Borg-Warner Corporation, Chicago, Ill., a corporation of Illinois Application February 19, 1951, Serial No. 211,742

21 Claims. (Cl. 143—135)

The present invention relates to chain saws and more particularly to an improved form of saw chain, a novel form of tooth for use therein and a novel method of kerf cutting which may most advantageously be practiced through the use of a saw chain embodying that novel form of tooth.

A primary object of the invention is to improve the operation of chain saws and to improve the method by which such tools, or comparable devices, cut their way through the work to which they are applied. More particularly, it is an object of the present invention to form a kerf by taking alternate cuts from opposite sides of such a kerf, each such cut severing, from the bottom of the kerf, a chip having a maximum thickness adjacent one wall of the kerf, and tapering to zero thickness as it retreats from that kerf wall, so that each cut completely detaches a chip from the bottom of the kerf. Preferably, such under-cutting is effected by a tool whose chip-forming blade passes beneath the severed chip, leaving that chip substantially undisturbed in the bottom of the kerf for subsequent scavenging removal by a following tool.

A further object of the invention is to provide an improved tooth, finding its primary utility in a chain saw, as an element of the chain used therein, such tooth being so shaped and positioned, as it is moved through the work, as to sever from the bottom of the kerf in which it operates, a chip of the character above described. A further object of the invention is to improve saw chains by the incorporation therein of a series of teeth of the character just described, certain of said teeth defining one wall of the kerf while the others of such teeth define the opposite wall of the kerf, such two types of teeth preferably being arranged alternately in the chain.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a fragmental side elevation of a portion of a saw chain constructed in accordance with the present invention;

Fig. 2 is a plan view, drawn to an enlarged scale, of a cutter-carrying link constructed in accordance with my invention;

Fig. 3 is a side elevation thereof;

Fig. 4 is a front elevation thereof;

Fig. 5 is a rear elevation thereof; and

Fig. 6 is a diagrammatic view, drawn to an enlarged scale, and illustrating the manner in which teeth constructed in accordance with the present invention will alternately remove from the bottom of the kerf chips of the character above described.

Chain saws, when first conceived and put into use in the forests, primarily for felling, limbing and bucking timber, utilized chains provided with a longitudinally arranged series of scoring teeth closely similar, both functionally and structurally, to the teeth of an ordinary hand saw. As the art developed, very gradually at first, raker teeth, intended to dig into the bottom of a kerf and to scrape chips ahead of them to the outlet end of the kerf, were introduced into the series of scratcher or scoring teeth previously known; and this departure improved the action of chain saws. These raker teeth were closely similar, in structure and function, to the raker teeth which had long been conventionally used in one-man and two-man cross cut saws.

A radical innovation came into the art with the development of the type of chain saw including a tooth having a sharpened shank running in, and defining, a side wall of the kerf to be formed, and carrying, at its end remote from the chain, a sharpened toe, projecting away from that wall of the kerf, and adapted and intended to undercut a chip from the bottom of the kerf, said toe sliding beneath the chip and leaving it, substantially undisturbed in the bottom of the kerf, for subsequent scaveninging by a following tool.

That following tool was, functionally, not only a scavenger but also a depth gauge for the next tooth of the chain having a portion running in the plane of the same wall of the kerf. That depth gauge was so positioned as to ride upon the kerf bottom surface newly formed by the preceding tooth toe, which had undercut a chip. In the earliest chain of this type, two undercutting tools were carried by a single link of the chain, one defining one wall of the kerf and having a toe extending toward the opposite kerf wall, and the other defining an opposite wall of the kerf and having a toe extending, toward the first-named kerf wall, far enough to overlap the path of the toe of the first-named tool. The two cutters, thus working together on a common link, and with their toe edges disposed in a common plane, were expected to loosen a chip completely from the kerf bottom and to define a new bottom lying in a common plane, upon which the following scavenger and depth gauge might ride.

As the commercial art developed, it was discovered that it was feasible, and in some respects desirable, to rearrange this specific tooth grouping and to make up a chain consisting solely of cutters of the character described above, each cutter being carried upon a separate link, and including a depth gauge for each cutter.

In one such form of chain, the depth gauge for each tooth travels in the plane of the body of the link which carries that tooth. The shank of that tooth is offset outwardly from that plane to define a kerf wall, while the toe of that tooth traverses that plane and projects therebeyond toward the opposite wall of the kerf. That toe will undercut a portion of the kerf bottom extending from that kerf wall more than half way toward the opposite kerf wall.

The depth gauge for the next following tooth, which following tooth is of opposite hand, will ride, not on the new bottom formed by the toe of the preceding tooth, but on the kerf bottom formed by the tooth ahead of the next preceding tooth—in other words, the tooth of the same hand. Consequently, during operation of such a chain, the kerf bottom, at any point in its length, will be made up of two surfaces lying in different, parallel planes, with a step defined between those two planes.

It follows that, with such a chain, no tooth ever completely separates or disengages a chip from the kerf bottom. Instead, each tooth lifts a flap, severed from one wall of the kerf, but connected, at its edge remote from that kerf wall, by an integument of substantial breadth and thickness, to a flap severed, by the next preceding tooth, from the opposite wall of the kerf, and similarly connected to a flap to be severed from the opposite wall of the kerf by a following tooth.

A known chain embodying another form of teeth will perform in a somewhat similar manner, though the tooth toes incline toward the link bodies as they retreat from the kerf walls. Since the tooth toes of this chain do not overlap, they do not completely separate chips from the kerf bottom.

According to the present invention, an entirely different kind of action is produced. Instead of undercutting, in planes perpendicular to the plane of the cutter-carrying link body, I undercut in planes oppositely inclined at acute angles to that body plane; and my cutters are of such extent that the undercutting edge of each cutter intersects the plane of travel of the undercutting edge of the next preceding cutter, whereby each cutter completely separates from the kerf bottom a chip having maximum thickness adjacent the kerf wall in which travels one element of the cutter, and tapering to zero thickness as such chip retreats from that wall.

Additionally, I arrange my depth gauges, with respect to their associated cutters, in such a fashion that each depth gauge travels upon a surface defined by the next preceding cutter, thereby more satisfactorily and effectively maintaining uniformity of depth of cut among the several teeth of the chain.

Referring more particularly to the drawings, it will be seen that I have shown a section of chain, indicated generally by the reference numeral 10, and comprising center links 11 adapted to travel in the usual cutter bar channel, joined by side links 13 and cutter links 12. In the illustrated embodiment of my invention, the cutter links act as side links; but it will be obvious that many of the advantages of the present invention could be attained in a chain in which the cutters and depth gauges are carried upon center links of the chain.

All of the cutter links in the chain are identical, except that one-half such cutter links are right-hand constructions, while the other half of such cutter links are left-hand constructions. Right-hand and left-hand cutter links, according to the present invention, bear an allochiral relation to each other; and right-hand links and left-hand links are arranged in alternation in the chain, according to the preferred embodiment of my invention.

At its forward end 14, each cutter link 12 carries a depth gauge 15, and near its rear end 16, each such link carries a tooth indicated generally by the reference numeral 17. Each tooth comprises a portion 18 deflected laterally from the plane of the link body and carrying, at its outer end, a slicing portion 19. In the illustrated embodiment of my invention, the tooth sections 18 and 19 are sharply angularly related to each other; but this is not an essential feature of the invention even though I presently consider the illustrated form to be optimum. Essentially, it is only necessary that there shall be a portion of the tooth having a sharpened edge to travel in the plane of one lateral boundary of the kerf, and a portion of the tooth having a sharpened edge so disposed as to undercut a chip having a maximum thickness adjacent such kerf wall and tapering to zero thickness as it retreats from the tooth wall.

As is most clearly to be seen in Fig. 5, the outermost surface 20 of the portion or toe 19 of the tooth 17 is transversely horizontal or perpendicular to the plane of the link body. Longitudinally, that surface 20 is inclined rearwardly toward the link body, as is most clearly to be seen in Fig. 3. The leading edge of the toe 19 is beveled or otherwise shaped to define a chisel edge 21 which, as is most clearly to be seen in Fig. 2, is inclined or raked rearwardly as it retreats from the position of maximum deflection of the shank 18. Because of this rake, and the downward and rearward inclination of the surface 20, the edge 21 is inclined downwardly or toward the link body as it retreats from the point of maximum deflection of the shank 18, in the manner illustrated in Fig. 4.

The forward face of the shank 18 is likewise beveled or otherwise shaped to define a chisel edge 22 which preferably is rounded or recessed in the manner most clearly to be seen in Figs. 2 and 3, whereby the edges 21 and 22 meet in a sharp point located in advance of any other point on either of said edges.

The depth gauge 15 is deflected from the plane of the link body in a direction opposite the direction of deflection of the tooth shank 18; and the outermost or active end 23 of said depth gauge terminates short of the maximum projection of the tooth, so that all of the edge 21, and the terminal portion of the edge 22, will lie beyond the end surface 23 of the depth gauge to attack the work.

As is clearly to be seen in Figs. 2, 4, 5 and 6, the toe 19 extends from the point of maximum deflection of the shank 18 toward and to traverse the plane of the link body. Preferably, the toes 19 of both right-hand and left-hand links will project far enough to traverse the median plane of the chain in which they are assembled; but whether or not they both traverse that plane, the toes of the right-hand links and the toes of the left-hand links must be of such relative extents that, when assembled in a chain, the toe of each link will travel in a plane intersecting the travel plane of the toe of the next preceding link.

In Fig. 6, I have diagrammatically illustrated the action of a chain constructed in accordance with the present invention. The tooth illustrated in Fig. 6 is shown making a scoring cut, with its point 24, to deepen the wall 25 of a kerf previously started. At the same time, its toe edge 21 is traveling in the plane 26 to sever a chip 27 having its maximum depth 28 adjacent said wall 25 and tapering to zero thickness in the line 29 in which the toe edge 21 emerges through the surface 30 defined by a preceding tooth, of opposite hand, as said tooth removed a chip 31. It will be seen that said chip 31 had its maximum thickness adjacent the opposite kerf wall 32, and tapered to zero thickness in the line 34. It will also be seen that the depth gauge end 23 for the illustrated tooth is traveling, not upon any surface defined by a preceding tooth of the same hand with the illustrated tooth, but upon the surface 30 defined by the next preceding tooth, which was of opposite hand.

The tooth, of opposite hand, which immediately follows the illustrated tooth, will be disposed with its depth gauge riding upon the surface 26, and its toe will undercut a new chip 35 to define a new surface 36 emerging through the surface 26 in the line 37.

For the first time, in the present art, then, I have devised a saw chain tooth construction of such character that each tooth in the chain completely separates an independent chip from the bottom of the saw kerf as the tooth moves through that kerf, the tooth further being of such character that it slides beneath the chip so undercut, leaving the chip substantially undisturbed in the kerf, to be scavenged by the depth gauge of the next following tooth in the chain, said next following tooth being of opposite hand and being guided to cut a chip of uniform maximum depth, by engagement of its depth gauge with the new surface defined by the next preceding tooth.

I claim as my invention:

1. A saw chain comprising a plurality of pivotally-joined links, certain of said links having formed thereon laterally-extending slicing elements extending from one marginal edge of said chain toward, and traversing the longitudinal median plane of said chain; said certain links being longitudinally spaced in said chain and some of them having their slicing elements extending from one marginal edge of said chain while others of them have their slicing elements extending from the opposite marginal edge of said chain, said some and other certain links having their slicing elements disposed so as to intersect the path of the next preceding slicing element so as to separate completely an independent chip from the material sawed, and a depth gauge for each slicing element positioned in said chain ahead of the corresponding slicing element to control the depth of cut of such slicing element comprising means defining an active end portion adapted to engage the surface of the material sawed created by the immediately preceding slicing element.

2. A saw chain comprising a plurality of pivotally-joined links, certain of said links having formed thereon laterally-extending slicing elements extending from one marginal edge of said chain toward, and traversing, the longitudinal median plane of said chain, alternate ones of said slicing elements being of opposite hand and each slicing element being disposed so as to intersect the path of the next preceeding slicing element so as to separate completely an independent chip from the material sawed, and a depth gauge for each slicing element positioned ahead of its corresponding slicing element and behind a preceding slicing element of opposite hand, each such depth gauge, when said chain is in use, riding over a cut surface defined by said preceding slicing element to limit the depth of cut of said corresponding slicing element.

3. A saw chain comprising a plurality of pivotally-joined links arranged in a longitudinally-extending series, certain of said links carrying cutters, each of said cutters comprising a portion deflected laterally from the median plane of said chain and a portion traversing said median plane, said last-named portion of each cutter intersection the path of the corresponding portion of the next preceeding cutter whereby to separate completely an independent chip from the material sawed and a depth gauge for each cutter arranged in advance of its cutter and deflected laterally in a direction opposite the direction of deflection of the deflected portion of its cutter.

4. A saw chain comprising a plurality of pivotally-joined links arranged in a longitudinally-extending series, certain of said links carrying cutters, each of said cutters comprising a portion deflected laterally from the median plane of said chain and a portion traversing said median plane, said last-named portion of each cutter intersecting the path of the corresponding portion of the next preceeding cutter whereby to separate completely an independent chip from the material sawed and a depth gauge for each cutter arranged in advance of its cutter and deflected laterally in a direction opposite the direction of deflection of the deflected portion of its cutter, alternate cutters in said chain having their deflected portions deflected in opposite directions from said plane.

5. A saw chain comprising a plurality of pivotally-joined links arranged in a longitudinal series, each of said links having a generally planar body and certain of said links carrying cutters, each of said cutters being formed to define a first portion projecting outwardly from its link body and deflected laterally from the plane of its body, and a second portion extending from the outer end of said first portion toward and traversing said body plane, and a depth gauge for each cutter having an outward projection less than that of said cutter first portion, each of said cutter portions having a forwardly-presented chisel edge, and the chisel edge of said second cutter portion inclining toward said link body as it recedes from said first cutter portion and intersecting the path of the corresponding edge of the next preceding cutter in the chain; successive cutters in said chain being of opposite hand.

6. A saw chain comprising a plurality of pivotally-joined links arranged in a longitudinal series, each of said links having a body and certain of said links carrying cutters, each of said cutters being formed to define a first portion projecting outwardly from its link body and deflected laterally from the median plane of said chain, and a second portion extending from the outer end of said first portion toward and traversing said median plane, and a depth gauge for each cutter, each such depth gauge being carried on the same link with its cutter and being oppositely laterally deflected from its link body, each depth gauge having an outward projection less than that of said cutter first portion, each of said cutter portions having a forwardly-presented chisel edge, and the chisel edge of said second cutter portion inclining toward said link body as it recedes from said first cutter portion and intersecting the path of the chisel edge of the corresponding cutter portion of the preceding cutter.

7. The chain of claim 8 in which alternate cutter-carrying links in said chain have first cutter portions deflected equally and oppositely from said plane, whereby the depth gauge for each cutter, when said chain is in use, runs in a kerf-bottom surface defined by the second portion of the next preceding cutter.

8. The chain of claim 8 in which the free end of the chisel edge of said second portion of each cutter is closer to the pitch line of said chain than is the active end of the depth gauge associated with the next following cutter when said chain is in cutting operation.

9. A saw chain comprising a pivotally-connected series of links, certain of said links carrying cutters, each cutter having a first portion located in one lateral margin of the chain and a second portion extending more than half way from said one margin to the opposite margin of said chain, alternate cutters on said chain having their first portions oppositely disposed, and the second portion of each cutter intersecting the paths of movement of the second portions of cutters adjacent thereto in said chain.

10. A tooth-carrying link for use in a saw chain, comprising a generally planar body, a depth gauge carried adjacent one end of said body, projecting therefrom, and laterally deflected in one direction from the plane of said body, and a cutter tooth carried adjacent the opposite end of said body and projecting generally in the same direction from said body, said tooth comprising a portion laterally deflected in the opposite direction from the plane of said body and a portion remote from said body and extending laterally from said deflected portion toward and traversing the plane of said body, both of said tooth portions being beveled to define cutting edges at their surfaces adjacent said depth gauge, and the free end of the cutting edge of said second-named portion being less remote from said body than is the opposite end thereof and being disposed so as to intersect the path of the corresponding portion of the next preceding cutter tooth in the chain.

11. A method of kerf cutting which comprises the steps of making a generally rectilinear scoring cut to define a kerf boundary while undercutting a chip having a maximum thickness adjacent said boundary and tapering to zero thickness in a line substantially parallel with said boundary and located more than halfway from said boundary to an opposite boundary of said kerf, and subsequently making a second generally rectilinear scoring cut substantially parallel with said first-named scoring cut to define such opposite boundary, while undercutting a further chip having a maximum thickness adjacent said opposite boundary and tapering to zero thickness in a line substantially parallel with said boundaries and located more than halfway from said opposite boundary to said first-named boundary.

12. A method of kerf cutting which comprises the steps of making a generally rectilinear scoring cut to define one lateral boundary of a kerf while undercutting a chip having a maximum thickness adjacent said boundary and tapering to zero thickness as it recedes from said boundary, and subsequently making a second generally rectilinear scoring cut, substantially parallel with said first-named scoring cut, to define an opposite boundary of such kerf while undercutting a second chip having a maximum thickness adjacent said opposite boundary and tapering, as it recedes from said opposite boundary, to zero thickness in a line intersecting the surface defined by the undercutting of said first-named chip.

13. A method of kerf cutting which comprises the steps of making a generally rectilinear scoring cut to define one lateral boundary of a kerf while undercutting a chip having a maximum thickness adjacent said boundary and tapering to zero thickness as it recedes from said boundary, said scoring cut and said undercutting being effected with a single tool which leaves such chip substantially undisturbed on the kerf, and subsequently making a second generally rectilinear scoring cut, subtantially parallel with said first-named scoring cut, to define an opposite boundary of such kerf while undercutting a second chip having a maximum thickness adjacent said opposite boundary and tapering, as it recedes from said opposite boundary, to zero thickness in a line intersecting the surface defined by the undercutting of said first-named chip, said second scoring cut and undercutting being effected with a second single tool which leaves such second chip substantially undisturbed in the kerf.

14. A saw chain comprising a pivotally-connected series of links, certain of said links carrying a cutter extending from the body of the link, each cutter having a first portion extending at an angle to the body of the link and located in one lateral margin of the chain and provided with a forwardly-presented chisel edge and a second portion extending at an acute angle from the first portion and more than one-half way from said one margin to the opposite margin of said chain and having a forwardly-presented chisel edge, alternate cutters on said chain having their first portions oppositely disposed to position the chisel edge of the second portion of each cutter to intersect the paths of movement of the chisel edges of the second portions of the cutters adjacent thereto in said chain.

15. A saw chain comprising a pivotally-connected series of links, certain of said links bearing cutters, each cutter having a first portion provided with a forwardly-presented chisel edge, each cutter also having a second portion connecting said first portion to the body of the link and provided with a forwardly-presented chisel edge, said first portion extending more than half-way between opposite margins of the chain, alternate cutters on said chain having their second portions oppositely disposed and the chisel edge of the first portion of each cutter intersecting the paths of movement of the chisel edges of the first portions of cutters adjacent thereto in said chain.

16. A saw chain comprising a pivotally-connected series of links, certain of said links carrying cutters, each cutter having a shank located in one lateral margin of the chain and provided with a forwardly-presented chisel edge and a toe extending laterally of said shank and more than half-way from said one margin to the opposite margin of said chain and having a forwardly-presented chisel edge, alternate cutters on said chain having their shanks oppositely disposed with the chisel edges of the toes disposed at an angle to each other and the chisel edge of the toe of each cutter intersecting the paths of movement of the chisel edges of the toes of cutters adjacent thereto in said chain.

17. A saw chain comprising a plurality of links, first means on certain of said links defining cutters extending inwardly toward the median plane of said chain from one lateral margin thereof, second means on other of said links defining cutters extending inwardly toward the median plane of said chain from the other lateral margin thereof, means disposing said certain and other links alternately and spaced longitudinally of said chain, said first and second means each being disposed so as to respectively intersect the path of the other whereby to respectively separate completely an independent chip from the material sawed, a depth gauge on each of said certain links comprising means defining an active end portion adapted to engage the surface of the material sawed created by the immediately preceding cutter, and a depth gauge on each of said other links comprising means defining an active end portion adapted to engage the surface of the material sawed created by the immediately preceding cutter.

18. A saw chain comprising a plurality of pivotally joined links arranged in a longitudinal series, each of said links having a generally planar body and certain of said links carrying cutters, each of said cutters being formed to define a first portion projecting outwardly from its link body and deflected laterally from the plane of its body, and a second portion extending from the outer end of said first portion toward and traversing said body plane, a depth gauge for each cutter, each of said cutter portions having a forwardly presented chisel edge, and the chisel edge of said second cutter portion inclining toward said link body as it recedes from said first cutter portion and intersecting the path of the corresponding edge of the next preceding cutter in the chain, successive cutters in said chain being of opposite hand.

19. A tooth-carrying link for use in a saw chain, comprising a body, a depth gauge carried adjacent one end of said body projecting therefrom and laterally deflected from the plane of said body, and a cutter tooth carried by said body spaced from said depth gauge and projecting generally in the same direction from said body, said tooth comprising a portion deflected from the plane of said body and a portion remote from said body integral with and extending laterally from said deflected portion toward and traversing the plane of said body, both of said tooth portions being beveled to define cutting edges at their respective surfaces facing said depth gauge, and the free end of the cutting edge of said second-named portion being less remote from said body than is the opposite end thereof and being disposed so as to intersect the path of the corresponding portion of the next preceding cutter tooth in the chain.

20. A saw chain comprising a plurality of pivotally joined links arranged in a longitudinal series, each of said links having a generally planar body and certain of said links having cutting means formed thereon, each of said cutting means comprising a portion deflected laterally from the median plane of the chain and a portion disposed so as to traverse the median plane of the chain, each of said last-named portions intersecting the path of the corresponding portion of the next preceding cutter, and a depth gauge corresponding to each of said cutting means and disposed in advance thereof.

21. A saw chain comprising a plurality of pivotally joined links arranged in a longitudinal series, each of said links having a generally planar body and certain of said links having cutting means formed thereon, successive cutting means being of the opposite hand and each of said cutting means comprising a portion deflected laterally from the median plane of the chain and a portion disposed so as to traverse the median plane of the chain, each of said last-named portions intersecting the path of the corresponding portion of the next preceding cutter, and a depth gauge corresponding to each of said cutting means and disposed in advance thereof.

UNITED STATES PATENTS

References Cited in the file of this patent

| | | |
|---|---|---|
| 2,326,854 | Hassler | Aug. 17, 1943 |
| 2,508,784 | Cox | May 23, 1950 |
| 2,515,550 | Ciba | July 18, 1950 |
| 2,622,636 | Cox | Dec. 23, 1952 |
| 2,652,076 | Bye | Sept. 15, 1953 |